No. 886,167. PATENTED APR. 28, 1908.
O. C. & E. R. WEIKEL.
MOWER.
APPLICATION FILED JULY 25, 1907.
2 SHEETS—SHEET 1.
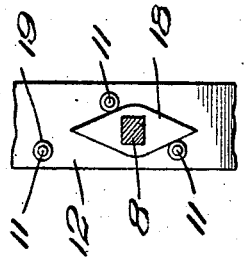
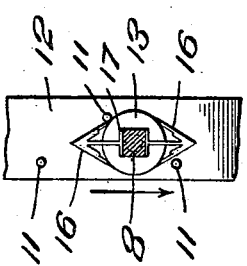
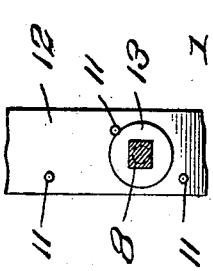
WITNESSES:
INVENTORS
O. C. Weikel and
E. R. Weikel
BY
W. J. FitzGerald & Co.
Attorneys

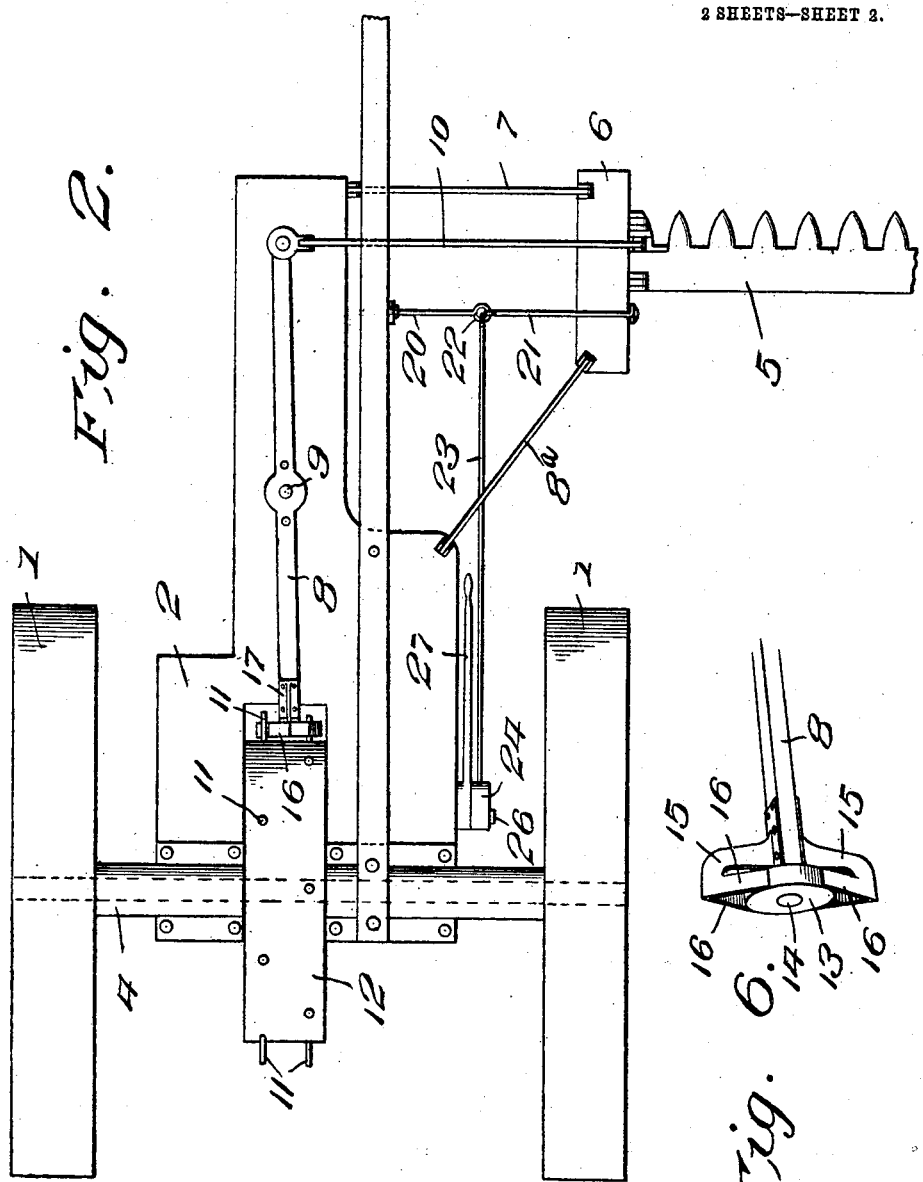

UNITED STATES PATENT OFFICE.

OSCAR CLAUD WEIKEL AND EBBERT RAY WEIKEL, OF RONCEVERTE, WEST VIRGINIA.

MOWER.

No. 886,167.　　　　Specification of Letters Patent.　　　Patented April 28, 1908.

Application filed July 25, 1907. Serial No. 385,590.

*To all whom it may concern:*

Be it known that we, OSCAR CLAUD WEIKEL and EBBERT RAY WEIKEL, citizens of the United States, residing at Ronceverte, in the county of Greenbriar and State of West Virginia, have invented certain new and useful Improvements in Mowers; and we do hereby declare the following to be a full, clear, and exact description of the invention, such as will enable others skilled in the art to which it appertains to make and use the same.

Our invention relates to mowers and reapers, and more particularly to controlling means for driving the sickle and also for elevating the sickle bar, and our object is to provide simple though reliably efficient means for actuating the sickle at the expense of a minimum amount of friction.

Other objects and advantages will be hereinafter clearly set forth, reference being had to the accompanying drawings which are made a part of this application and in which, Figure 1 shows a side elevation of our invention complete as applied to the mower. Fig. 2 is a top plan view thereof. Fig. 3 is a detail view showing a section of the sickle driving lever and a portion of the periphery of the wheel which drives or actuates said lever. Fig. 4 is a similar view showing a modified form from that shown in Fig. 3. Fig. 5 shows still another form from that presented in Figs. 3 and 4. Fig. 6 is a detail view of the sickle driving lever.

In order to conveniently refer to the various details of our invention reference numerals will be employed, the same numeral applying to a corresponding part throughout the several views.

Referring to the numerals on the drawings, 1 indicates the carrying wheels connected together in the usual manner by a suitable framework to an axle 3, a portion of the axle being provided with a sleeve or housing 4, and upon the framework 2 we locate the driver's seat, controlling levers, etc., as will be hereinafter more clearly set forth. The sickle bar 5, is also provided in the usual manner having a shoe 6 common to this class of machinery, and said shoe is pivotally connected to the frame section by means of the arms 7 and 8ª, or equivalent means.

Upon the frame section we mount the sickle driving lever 8 pivoted in position as indicated by the fulcrum point 9, the forward end of said lever being pivotally connected to the pitman 10 which latter is connected with the sickle in the usual way.

Upon the rear end of the sickle driving lever 8 we provide means to coöperate with a plurality of driving pins 11 which are staggered upon the periphery of the wheel 12 which latter is keyed rigidly to the axle and turns therewith.

By reference to Figs. 3 and 6 it will be observed that we have illustrated our preferred construction of the means placed in coöperation with the pins 11, said means consisting of the antifriction roller or wheel 13, which is disposed as an idler upon the sickle driving lever 8 by means of the bolt or pin 14 and upon the upper and lower sides of said roller or wheel we dispose guiding members 15 having the V-shaped blades 16, it being understood that said parts are reliably anchored in position by suitable bolts or screws as indicated by the numerals 17, or equivalent means. It therefore follows that since the pins are staggered upon the periphery of the wheel 12 and since the antifriction roller or wheel is placed immediately in front of the face of the wheel 12, said roller or wheel 13 will be engaged first by one pin and then by the opposite pin and the result will be that the end of the lever 8 will be moved to the right and to the left and thereby reciprocate the sickle. By providing the guiding members 15 with the blades 16 we make it certain that the wheel 13 will be reliably guided so that the exposed portion of the wheel will be brought into contact with each alternate pin and the result will be that friction will be reduced to a minimum.

In Fig. 4 we have shown the antifriction wheel or roller 13 without the guiding members or brackets 15, as in many instances it will not be necessary to provide said guiding members, and we therefore reserve the right to manufacture the same in either manner as we may deem most desirable.

In Fig. 5 we have shown still another form of construction wherein it will be seen we have removed the antifriction roller or wheel 13 and replaced the same with the substantially diamond shaped member 18, which is secured rigidly to the driving lever 8 in any preferred way and the result will be that the said member 18 will pass in a zigzag course between the guiding pins 11 and impart a reciprocatory movement to the sickle in the manner above explained.

When the diamond shaped member 18 is used as a substitute for the antifriction wheel or roller 13 we prefer to provide an individual antifriction roller 19 for each of the pins 11, thereby insuring that said rollers will successively engage the member 18 and bodily move the same laterally with the least amount of friction. We also provide controlling means for the sickle bar whereby it may be bodily raised and lowered as desired, said means consisting of the members 20 and 21 hinged together as indicated by the numeral 22 and connected at their pivot point with a controlling rod or shaft 23, the rear end of which is provided with a collar 24 which passes around the member 25 which latter is eccentrically mounted as indicated by the numeral 26.

A controlling lever 27 is connected with the member 25 and it therefore follows that since said member 25 is mounted upon the framework of the machine the controlling lever 27 when moved backward will elevate the sickle bar, and when moved forwardly the sickle bar will be lowered into its operative position.

It will thus be observed that we have provided means of reliable efficient character for actuating or driving the sickle with the least amount of friction and that a minimum amount of power will be required. It will furthermore be observed that we have provided a mower or reaper driving mechanism of very simple construction which may be cheaply manufactured and easily assembled in operative form, and while we have described the preferred combination and construction of parts we wish to comprehend in this application all substitutes and equivalents which may be regarded as falling fairly in the scope of our invention.

Believing that the construction and manner of using our invention have thus been made clearly apparent further description is deemed unnecessary.

What we claim is:

A device of the class described comprising the combination with a frame and carrying wheels therefor; of a driving wheel having a plurality of pins arranged in staggered form upon its periphery, a driving lever pivotally mounted on said frame, a cutter bar, an arm connecting one end of said lever to the cutter bar, a pin on the opposite end of said lever, a roller rotatably mounted on said pin, members secured to the upper and lower faces of said lever, V-shaped guiding members on said members and disposed above and below said roller, adapted to engage said pins upon the driving wheel, a shoe, arms pivotally secured to said shoe and frame, a rod, said rod and arms being pivotally connected at a common point, an eccentric pivotally mounted on the frame, a collar at the rear end of said rod and secured around said eccentric and a controlling lever connected with said eccentric, whereby when the lever is operated the sickle will be raised or lowered.

In testimony whereof we have signed our names to this specification in the presence of two subscribing witnesses.

OSCAR CLAUD WEIKEL.
EBBERT RAY WEIKEL.

Witnesses:
   JAS. R. JOHNSON,
   D. H. KAUFFELT.